US012748299B2

(12) United States Patent
Kondo

(10) Patent No.: US 12,748,299 B2
(45) Date of Patent: Sep. 29, 2026

(54) HEAD-MOUNTED LOUPE

(71) Applicant: KONDO LABO., INC., Aichi (JP)

(72) Inventor: Takehito Kondo, Aichi (JP)

(73) Assignee: KONDO LABO., INC., Aichi (JP)

( * ) Notice: Subject to any disclaimer, the term of this patent is extended or adjusted under 35 U.S.C. 154(b) by 315 days.

(21) Appl. No.: 18/477,094

(22) Filed: Sep. 28, 2023

(65) Prior Publication Data

US 2024/0027744 A1 Jan. 25, 2024

Related U.S. Application Data

(63) Continuation of application No. PCT/JP2022/020917, filed on May 20, 2022.

(30) Foreign Application Priority Data

Jun. 10, 2021 (JP) ................................ 2021-097510

(51) Int. Cl.
*G02B 25/00* (2006.01)
*H04N 23/57* (2023.01)

(52) U.S. Cl.
CPC ........... *G02B 25/004* (2013.01); *H04N 23/57* (2023.01)

(58) Field of Classification Search
CPC ...... G02B 25/004; G02B 23/02; G02B 23/18; G02B 25/00; H04N 23/57; A61B 90/36; A61B 2090/3616; A61B 2090/502; G02C 7/088; G02C 11/10; G02C 7/08
See application file for complete search history.

(56) References Cited

U.S. PATENT DOCUMENTS 5,042,930 A * 8/1991 Hutt ........................ G02B 7/002 348/E5.029
5,078,469 A * 1/1992 Clark ................... A61B 90/361 351/158
5,790,306 A * 8/1998 Kleinberg ............ G02B 27/126 359/638
D564,011 S * 3/2008 Beate ........................... D16/309
(Continued)

FOREIGN PATENT DOCUMENTS

JP 62-184079 A 8/1987
JP 11-215411 A 8/1999
(Continued)

OTHER PUBLICATIONS

International Search Report issued in corresponding International Application No. PCT/JP2022/020917 dated Jul. 5, 2022.

*Primary Examiner* — Balram T Parbadia
(74) *Attorney, Agent, or Firm* — RIMON P.C.

(57) ABSTRACT

Provided is a head-mounted loupe which can perform imaging coinciding with the line-of-sight of a wearer through a magnifying glass. The present invention comprises: a refractive member which is provided to one side in the front-rear direction of a magnifying glass and is positioned in a gaze, of a wearer, that passes through the magnifying glass; and a camera member which can image a target object via the refractive member. The refractive member makes it possible for the wearer to visually recognize the target object through the magnifying glass, and refracts the gaze axis of the camera member so as to cause said gaze axis to coincide with the gaze of the wearer.

4 Claims, 11 Drawing Sheets

(56) References Cited

U.S. PATENT DOCUMENTS

| | | | | |
|---|---|---|---|---|
| 2004/0070823 | A1* | 4/2004 | Radna | G02B 23/125 359/407 |
| 2007/0139796 | A1* | 6/2007 | Beate | G02B 27/0149 359/802 |
| 2014/0146153 | A1 | 5/2014 | Birnkrant et al. | |
| 2016/0054560 | A1* | 2/2016 | Alkouby | H04N 23/631 348/79 |
| 2021/0038339 | A1* | 2/2021 | Yu | G02B 25/008 |
| 2023/0138560 | A1* | 5/2023 | Palmisano | G02B 27/0172 359/643 |

FOREIGN PATENT DOCUMENTS

| | | | |
|---|---|---|---|
| JP | 2003-204972 | A | 7/2003 |
| JP | 2011-002642 | A | 1/2011 |
| JP | 2014-104365 | A | 6/2014 |
| JP | 3231356 | U | 3/2021 |

* cited by examiner

FIG.10A

Loupe Portion (Magnifying Glass)

| | |
|---|---|
| Magnification | 2．5X |
| Working Distance | 320～420mm |
| Field of View | 100mm |

Camera Member

| | | |
|---|---|---|
| Camera | CCD Size | 1／4 Inch |
| Lens | Focal Length | Example 1 ： 3．6～4 mm |
| | | Example 2 ： 6mm |

FIG.10B

Loupe Portion (Magnifying Glass)

| | |
|---|---|
| Magnification | 3．5X |
| Working Distance | 320～420mm |
| Field of View | 100mm |

Camera Member

| | | |
|---|---|---|
| Camera | CCD Size | 1／4 Inch |
| Lens | Focal Length | Rear Attachment ： 3．6～4 mm |
| | | Front Attachment ： 8mm |

HEAD-MOUNTED LOUPE

RELATED APPLICATION

This application is a Continuation Application of International Application No. PCT/JP2022/20917, filed May 20, 2022, which claims priority to Japan Application No. 2021-097510, filed Jun. 10, 2021. The subject matter of each is incorporated herein by reference in entirety.

TECHNICAL FIELD

The present invention relates to a head-mounted loupe that is worn on a wearer's head to allow the wearer to view a magnified object.

BACKGROUND ART

For example, Patent Document 1 proposes a binocular loupe that is mainly applied in the medical field. The binocular loupe is worn on the wearer's head so that the wearer can view a magnified object, and is also provided with a camera for photographing the object. According to such a configuration, for example, when an operation doctor wears the binocular loupe and performs an operation, an object visually recognized by the operation doctor can be image-captured by the camera to be displayed or recorded.

CONVENTIONAL ART DOCUMENT

Patent Literature

Patent Document 1: JP-2003-204972 A

SUMMARY OF INVENTION

Technical Problem

However, in the conventional configuration of Patent Document 1 described above, since the camera is arranged above the loupe, a line-of-sight axis of the camera extending from the camera lens to the object does not coincide with the line-of-sight of the wearer viewing the object via the loupe. As a result, during the operation described above, the image photographed by the camera deviates from the image visually recognized by the operation doctor. As a result, there was a case that the surgical situation by the operation doctor cannot be accurately conveyed to persons viewing the photographed image.

An object of the present invention is to provide a head-mounted loupe that can perform image-capturing that coincides with the line-of-sight of a wearer.

Solution to Problem

The present invention relates to a head-mounted loupe, including a frame portion worn on a wearer's head; and a pair of left and right magnifying glasses attached to the frame portion and arranged in front of each of the wearer's both eyes, in a use state where the frame portion is worn on the head of the wearer, characterized in that the head-mounted loupe includes a visible object image-capturing means having: a refracting member arranged on a front or rear side of the magnifying glasses and positioned on a line-of-sight of the wearer passing via the magnifying glasses in the use state; and a camera member that can capture a still image or moving image of an object via the refracting member, and being arranged in front of at least one of the left and right eyes of the wearer in the use state, and the refracting member is configured with prisms and allows the wearer to visually recognize an object through the magnifying glasses positioned in front of or behind the refracting member, and also refracts a gaze axis of the camera member to coincide the refracted gaze axis with a wearer's line-of-sight via the magnifying glasses. Here, the gaze axis of the camera member corresponds to an optical axis of the camera member.

According to such a configuration, in the use state, the gaze axis of the camera member coincides with a line-of-sight of the wearer via the magnifying glass without interfering with the line-of-sight, so the camera member can perform image-capturing at the wearer's eye level. Therefore, a captured image by the camera member allows other persons to view an object at the same line-of-sight as that of the wearer. For example, if an operation doctor uses the head-mounted loupe of the present invention during an operation, an assistant, observers, and other persons can see a surgical situation at the same eye level as the operation doctor, so it is easy for the assistant and observers to accurately understand the surgical situation.

In the head-mounted loupe of the present invention described above, a configuration is proposed, in which the refracting member of the visible object image-capturing means includes two right-angle prisms joined by arranging their slopes next to each other, and arranged on one side of the front and rear of the magnifying glass so that the gaze axis of the camera member is refracted by the slopes and coincides with the wearer's line-of-sight.

Here, since the refracting member is rectangular in shape, it is preferred to have anti-reflective coatings applied to two surfaces (a surface facing the magnifying glass and the back surface of the surface) through which the wearer's line-of-sight passes in the use state and a surface facing the camera lens of the camera member, and also to have black coatings applied to the remaining three surfaces to suppress the input and output of light.

In such a configuration, the refracting member is so-called a beam splitter, and can split incident light from the front into transmitted light that is transmitted from the back surface and reflected light that is reflected on the slope and directed to the side surface. The wearer, then, receives the transmitted light split by such a refracting member and the camera member receives the reflected light. As a result, the line-of-sight of the wearer can be coincided with the gaze axis of the camera member. Therefore, the above-mentioned effects of the present invention, by which, the camera member performs image-capturing at the eye level of the wearer, can be stably exhibited.

The head-mounted loupe of the present invention described above proposes such a configuration, in which a pair of left and right magnifying glasses are attached to the frame portion so as to be arranged in front of the wearer's both eyes with a predetermined gap in the use state, and the refracting member of the visible object image-capturing means is arranged behind the magnifying glass so as to be arranged in the gap in the use state.

Here, as a matter of course, in the camera member applied to the present invention, the image-capturing range to be image-captured via the magnifying glass is substantially the same as the visible range visually recognized by the wearer via the magnifying glass.

In such a configuration, since the visible object image-capturing means is arranged behind the magnifying glass, the head-mounted loupe can be made compact as a whole.

This has an excellent advantage of being easy to carry. In addition, by this configuration it is possible to prevent the front portion from becoming heavier, compared to a configuration in which the visible object image-capturing means is arranged in front of the magnifying glass, for example. As a result, it is possible to prevent the frame from easily shifting downward in the use state, for example.

The head-mounted loupe of the present invention described above proposes a configuration, in which the refracting member of the visible object image-capturing means is arranged in front of the magnifying glass, and the camera member of the visible object image-capturing means has the image-capturing range to be image-captured not via the magnifying glass that is substantially the same as the visible range visually recognized by the wearer via the magnifying glass.

In such a configuration, since the refracting member is arranged in front of the magnifying glass, the wearer views an image magnified by the magnifying glass, while the camera member captures an image not via the magnifying glass. In this configuration, since the image-capturing range of the camera member not via the magnifying glass is substantially the same as the visible range of the wearer via the magnifying glass, the captured-image by the camera member can be viewed in the same way as the wearer views the image. Therefore, when the loupe is used in the above-mentioned operation, for example, it becomes easier for an assistant and observers who view the captured image by the camera member to more accurately understand the surgical situation by the operation doctor.

A configuration is proposed in which he head-mounted loupe of the present invention described above includes a jump-up means that is pivotable between a use state where a pair of left and right magnifying glasses are positioned in front of both eyes of the wearer to allow the wearer to visually recognize an object via the magnifying glasses and a standby state where the magnifying glasses are positioned above the use position to disable the wearer to visually recognize the object via the magnifying glasses, wherein the left and right magnifying glasses are attached to the frame portion via the jump-up means, and the visible object image-capturing means is provided to be pivotable integrally with the magnifying glasses, and a camera member of the visible object image-capturing means has a cable for inputting and outputting signals and information relating to image-capturing that is extended laterally outward from the laterally outer part of the camera member.

Here, the laterally outer part indicates the left side part in the visible object image-capturing means in which the refracting member is arranged in front of the left eye, and the lateral outside indicates the left. On the other hand, in the visible object image-capturing means in which the refracting member is arranged in front of the right eye, the laterally outer part indicates the right side part and the lateral outside indicates the right.

In such a configuration, while the magnifying glasses are worn on the wearer's head, the wearer can switch the magnifying glasses between the use state and the standby state as needed, which are very convenient. In this configuration, since the cable of the camera member is extended laterally outside, when the magnifying glasses are pivotally moved between the use state and the standby state, the pivotal movement is less likely to be hindered by the cable, and tangling of the cable due to the pivotal movement is also suppressed. Furthermore, since it is possible to prevent the cable of the camera member from being arranged in front of the wearer's eyes, it is possible to prevent the cable from obstructing the wearer's visibility. Therefore, according to this configuration, it is possible to contribute to improvement of the wearer's work efficiency.

Advantageous Effects of Invention

According to the head-mounted loupe of the present invention, since the camera member can perform image-capturing at the wearer's eye level, other persons can view the object in the same manner as the wearer by the image-capturing of the camera member.

BRIEF DESCRIPTION OF DRAWINGS

A

FIG. 2 includes side views showing a loupe portion 6 of the head-mounted loupe 1, in which

FIG. 8 includes side views of the loupe portion 6 of the head-mounted loupe 51, in which

FIG. 10 includes explanatory tables, in which FIG. 10A describes part of specifications of the loupe portion 6 and a camera member 23 of the Examples 1, 2, and FIG. 10B describes part of specifications of variations.

DESCRIPTION OF EMBODIMENTS

Examples 1, 2 embodying the present invention will be described with reference to the accompanying drawings. In the examples, the front and rear direction indicates the front and rear direction of a wearer wearing the head-mounted loupes 1, 51 of the examples, and the left and right direction indicates the left and right direction of the wearer in the same manner. Furthermore, in the examples, front surface and front are used interchangeably.

Example 1

Figure 1:
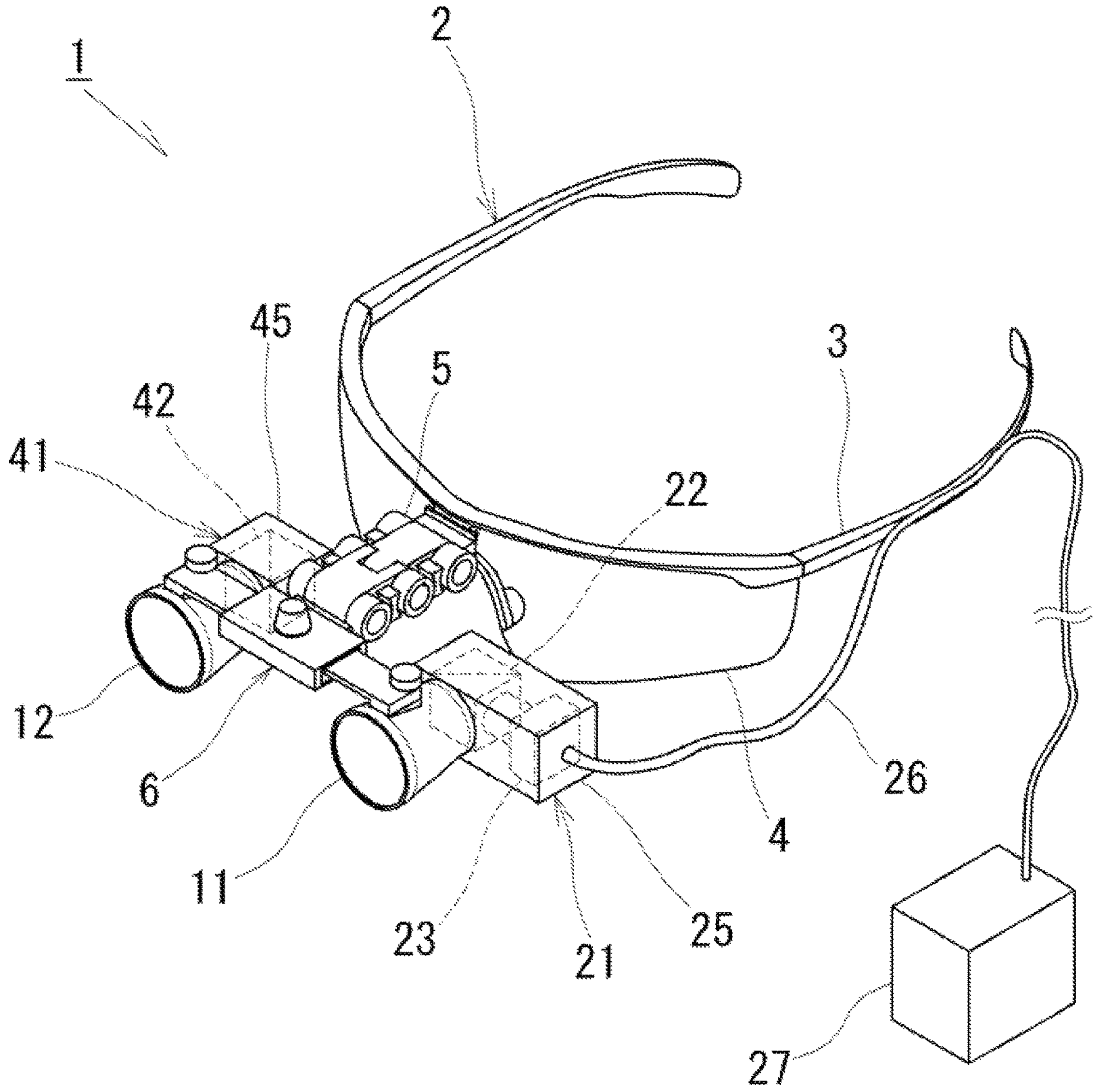
FIG. 1 is a perspective view showing a head-mounted loupe 1 of Example 1.
Figure 2A:
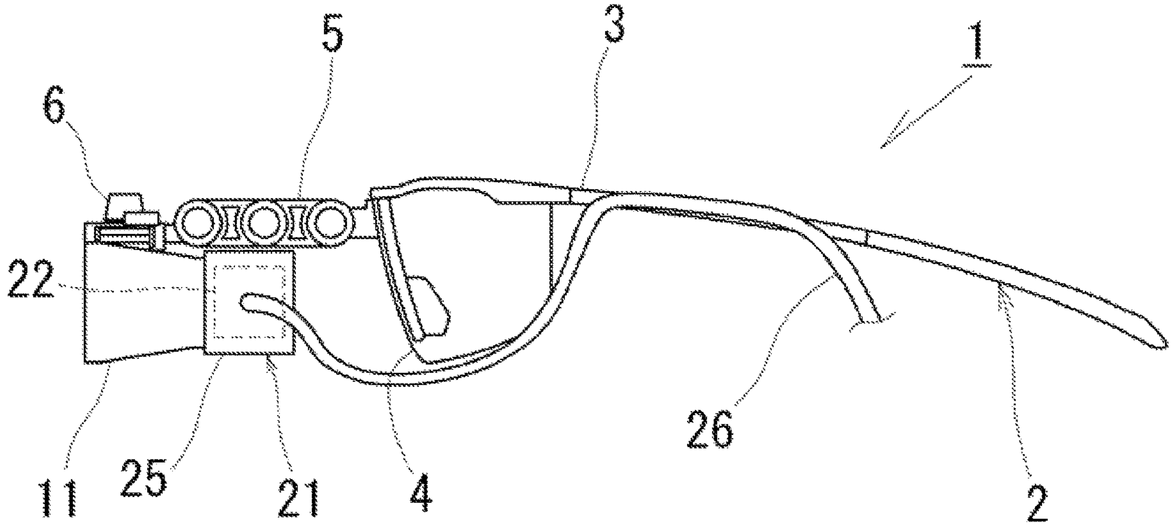
FIG. 2A illustrates a state in a use position.
Figure 2B:
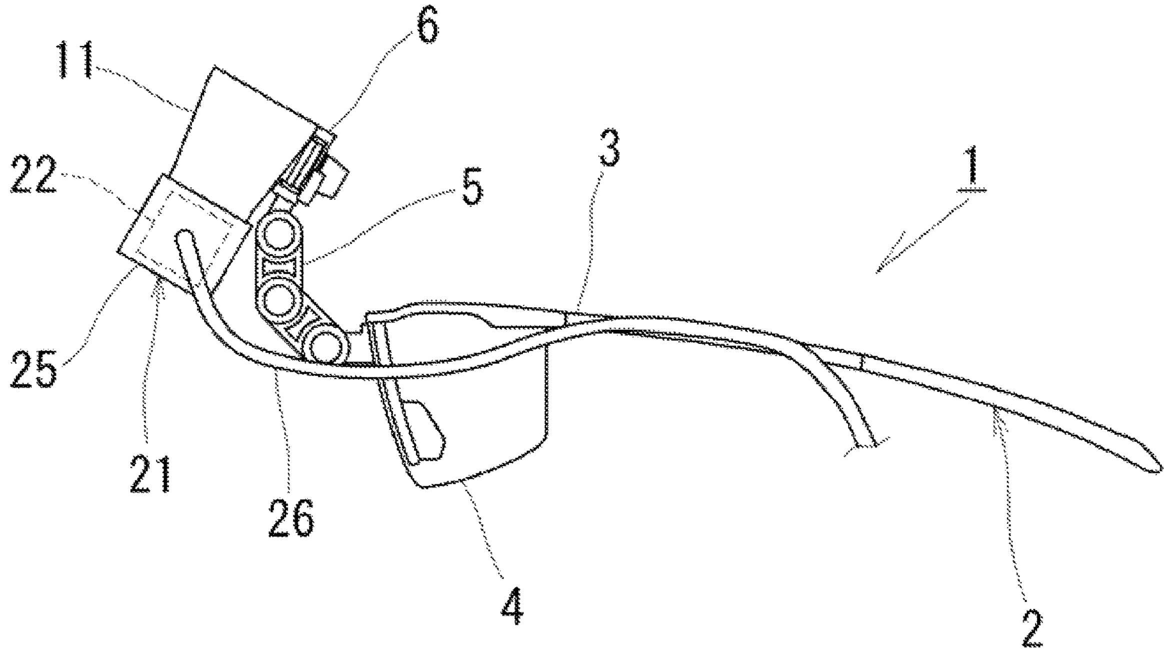
FIG. 2B illustrates a state in a standby position.

As shown in FIGS. 1, 2, the head-mounted loupe 1 of the Example 1 includes safety glasses 2, with which a transparent shield portion 4 arranged in front of both eyes of the wearer to cover both eyes and a frame portion 3 to be worn on the wearer's head by being worn on the wearer's both ears are integrally provided. The head-mounted loupe 1 also includes the binoculars-type loupe portion 6 attached to the central part of the frame portion 3 via a jump-up connection portion 5.

The loupe portion 6 has magnifying glasses 11, 12 arranged side by side in the left and right direction, including substantially truncated cone-shaped lens barrels and a lens fitted in each of the front and rear ends of the lens barrels, which allow the interval in the left and right direction to be changed accordingly. Since conventionally known configuration can be applied to such a loupe portion 6, details thereof are omitted.

Figure 8A:
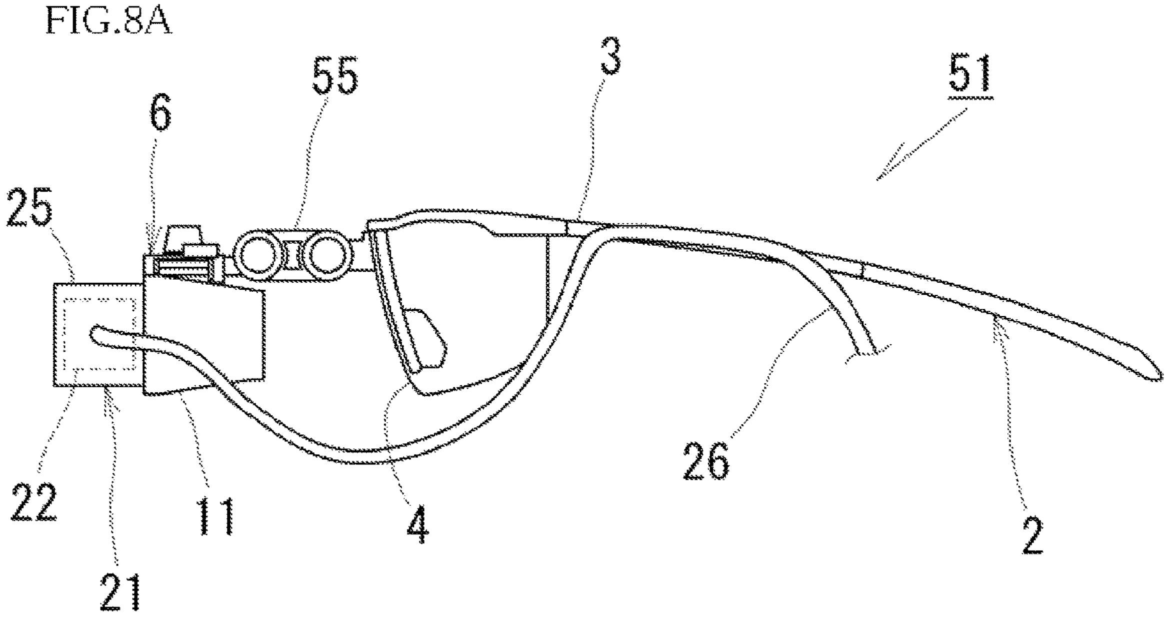
FIG. 8A illustrates a use state.
Figure 8B:
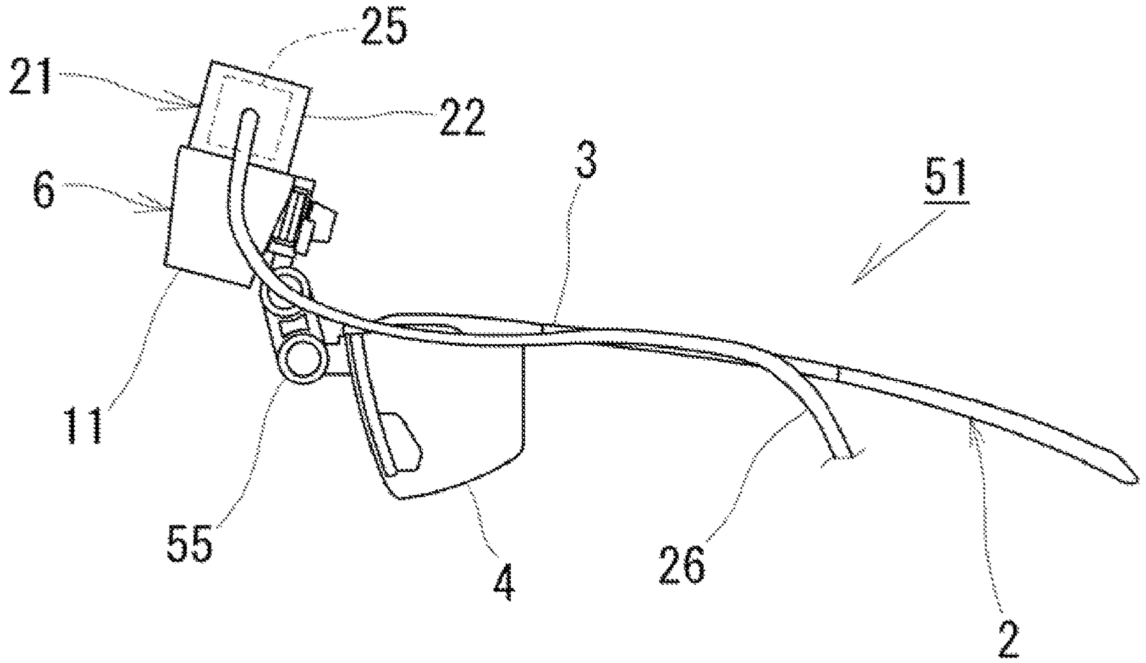
FIG. 8B illustrates a standby state.

The loupe portion 6 is pivotally supported by the jump-up connection portion 5 so as to be pivotable in the vertical direction, and can be switched between a use position (see FIG. 8A), in which the loupe portion 6 is arranged in front of the shield portion 4, and a standby position (see FIG. 8B), in which the loupe portion 6 is arranged above the shield portion 4 by tilting upward from the use position. In the use position, while the head-mounted loupe 1 is worn on the wearer's head, the magnifying glass 11 on the left side of the loupe portion 6 is arranged in front of the wearer's left eye and the right magnifying glass 12 is arranged in front of the wearer's right eye. By setting the loupe portion 6 to the use position, the wearer can look into the magnifying glasses 11, 12 of the loupe portion 6 and view an object magnified with the magnifying glasses 11, 12. On the other hand, in the standby position, the loupe portion 6 is arranged above the shield portion 4, so that the wearer can view the object without looking via the loupe portion 6. Here, in the Example 1, as will be described later, the visible object image-capturing device 21 and the visual aid 41 are arranged at the rear part of the loupe portion 6, and these are pivotally moved integrally with the loupe portion 6. In the standby position, the visible object image-capturing device 21 and the visual aid 41 are arranged above the shield portion 4 together with the loupe portion 6.

Figure 3A:
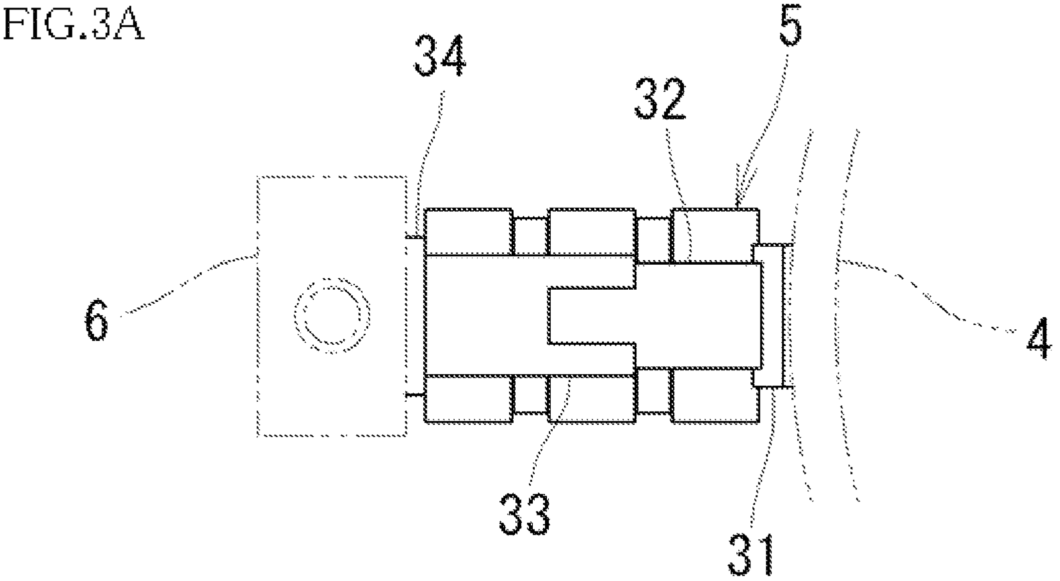
FIG. 3A is a plan view.
Figure 3B:
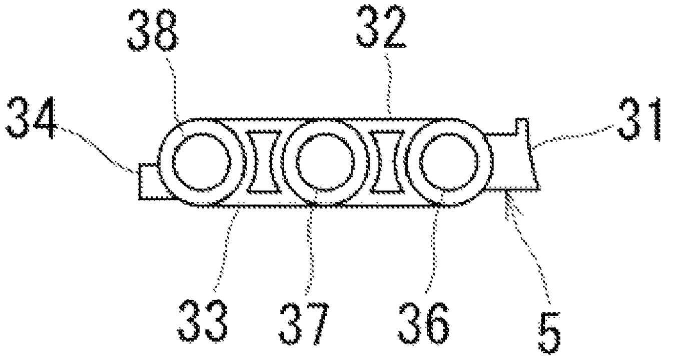
FIG. 3B is a side view.
Figure 3C:
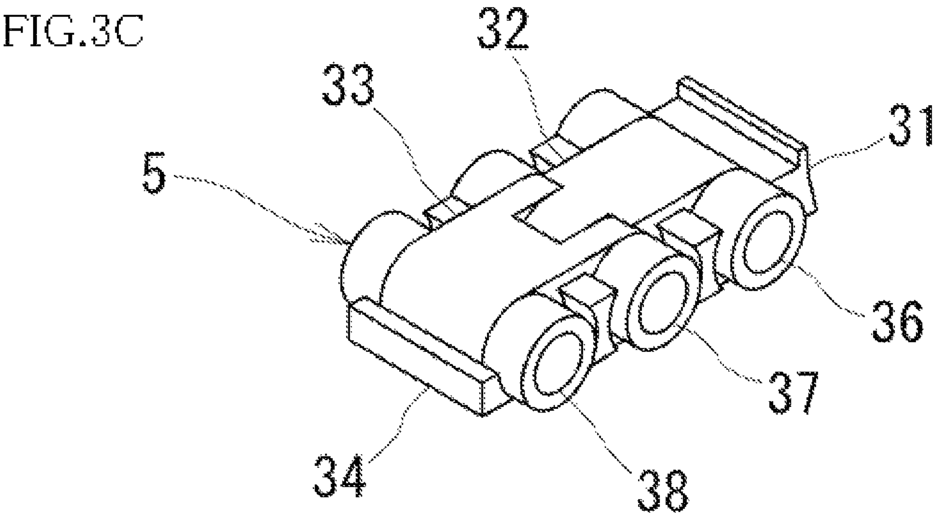
FIG. 3C is a perspective view, of a connection portion 5.

As shown in FIG. 3, the jump-up connection portion 5 of the Example 1 includes a frame fixing portion 31 fixedly set to the central part of the frame portion 3, a first rotating portion 32 pivotally supported by the frame fixing portion 31 via a first support shaft 36, a second rotating portion 33 pivotally supported by the first rotating portion 32 via a second support shaft 37 parallel to the first support shaft 36, and a loupe fixing portion 34 pivotally supported by the second rotating portion 33 via a third support shaft 38 parallel to the second support shaft 37 and fixed to the loupe portion 6. Thus, the jump-up connection portion 5 can pivotally move the loupe portion 6 relatively in the vertical direction to the frame portion 3 by pivotally moving the first to third support shafts 36 to 38 along the left and right direction accordingly. Then, the loupe portion 6 can be arranged at an appropriate use position according to the wearer. According to the jump-up connection portion 5 of the Example 1, the loupe portion 6 can be pivotally moved within the range of 160 to 210 degrees between the use position and the standby position while being worn by the wearer.

Note that in the example, while the head-mounted loupe 1 is worn on the wearer's head, the state where the loupe portion 6 is set at the use position is the use state according to the present invention, and the state where the loupe portion 6 is set at the standby position is the standby state according to the present invention. In addition, in the Example 1, the jump-up connection portion 5 corresponds to the jump-up means according to the present invention.

Next, the essential part of the present invention will be explained. As shown in FIGS. 1, 2, in the configuration of the Example 1, the visible object image-capturing device 21 is attached to, the rear part of the left magnifying glass 11 configuring the loupe portion 6, which faces the shield portion 4 at the use position, and also the visual aid 41 is attached to, the rear part of the right magnifying glass 12, which faces the shield portion 4 in the use position. Here, since the visible object image-capturing device 21 and the visual aid 41 are fixed to the loupe portion 6, they pivotally move in the vertical direction integrally with the loupe portion 6. At the use position (see FIG. 8A) of the loupe portion 6, the visible object image-capturing device 21 and the visual aid 41 are arranged between the loupe portion 6 and the shield portion 4 of the safety glasses 2, while at the standby position (see FIG. 8B), they are positioned above the shield portion 4 not to obstruct the wearer's visibility. Note that the visible object image-capturing device corresponds to the visible object image-capturing means according to the present invention.

Figure 4A:
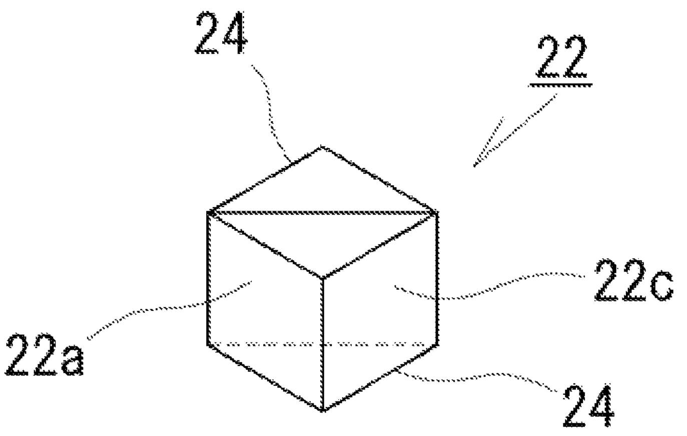
FIG. 4A is a perspective view as seen from the front.
Figure 4B:
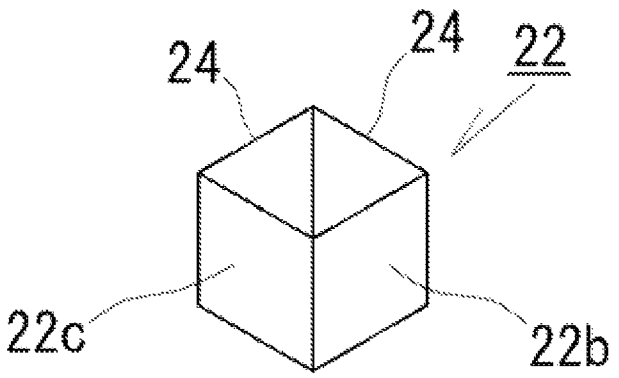
FIG. 4B is a perspective view as seen from the rear.
Figure 4C:
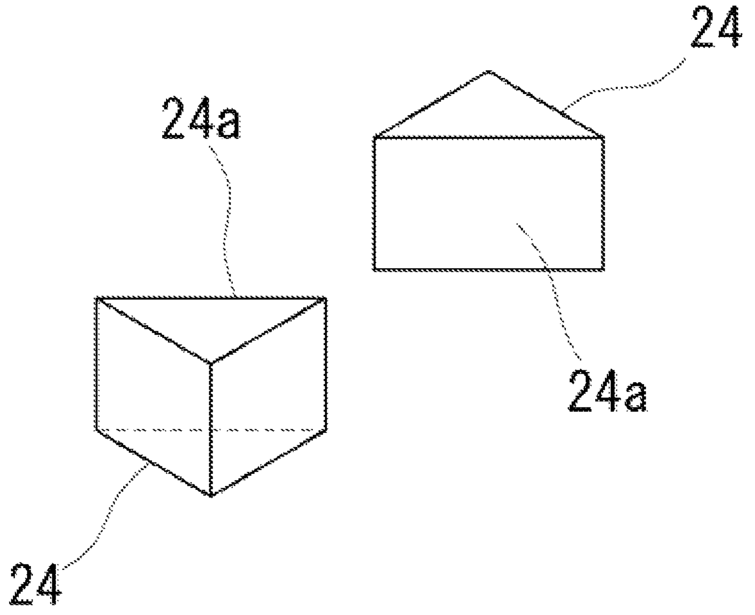
FIG. 4C is an exploded perspective view, of a refracting member 22.
Figure 5A:
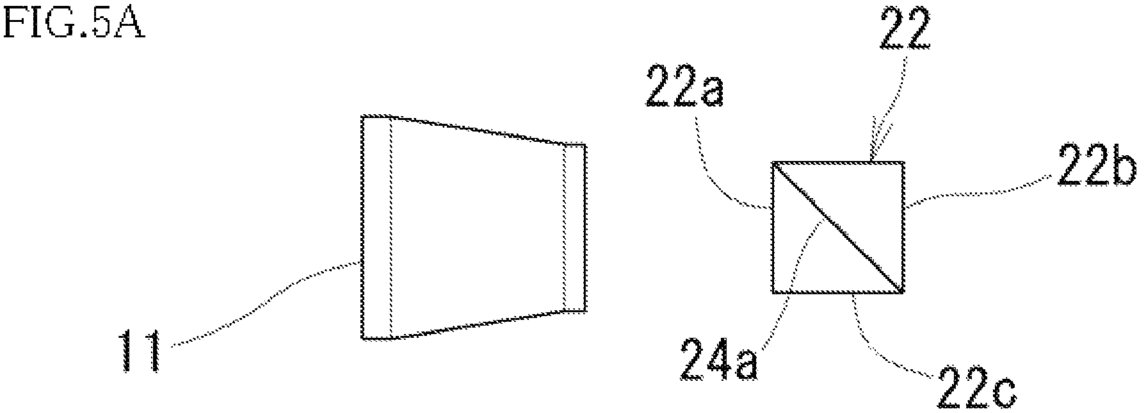
FIG. 5A is a plan view.
Figure 5B:
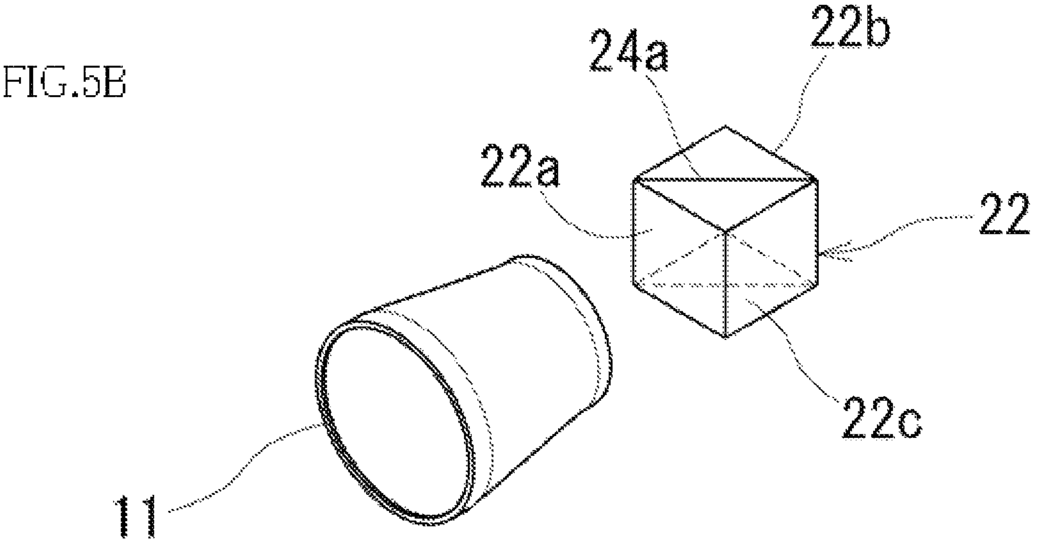
FIG. 5B is a perspective view as seen from the front.
Figure 5C:
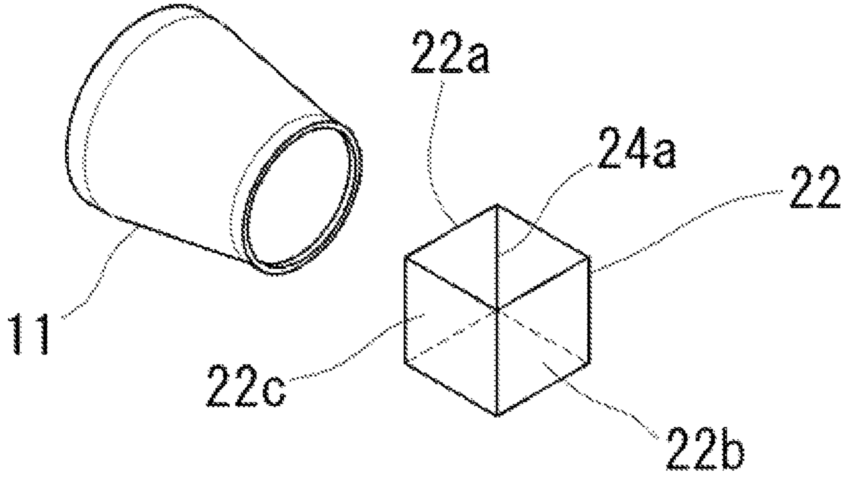
FIG. 5C is a perspective view as seen from the rear, describing the arrangement relationship between the loupe portion 6 and the refracting member 22 of a visible object image-capturing device 21.

The visible object image-capturing device 21 is provided with a refracting member 22 and a camera member 23. As shown in FIG. 4, the refracting member 22 is a cube formed by unifying two right-angle prisms 24, 24 with their slopes 24*a*, 24*a* being disposed next to each other and joined, and is a so-called cube-shaped beam splitter. As shown in FIG. 5, the refracting member 22 is arranged immediately behind the left magnifying glass 11 so that the slopes 24*a*, 24*a* extend in an oblique direction from the left rear end to the right front end in the use position, and the front surface 22*a* of the refracting member 22 faces the rear surface portion of the magnifying glass 11 (the lens surface fitted in the rear end of the lens barrel). The refracting member 22 has the front surface 22*a*, a rear surface 22*b* (a surface facing the shield portion 4 in the use state), and a left side surface 22*c*, to which anti-reflective coatings are applied, and to other three surfaces, black coatings are applied to suppress the input and output of light. Furthermore, a mirror coating (metal coating) is applied to at least one slope 24*a* of the two right-angle prisms 24, 24 configuring the refracting member 22. Here, the rear surface 22*b* can also be called a back surface.

The camera member 23 is configured with a CCD camera and is arranged on the left side of the refracting member 22 with the camera lens facing the left side surface 22*c* of the refracting member 22. In the camera member 23, a cable 26 is connected to the left side part when being arranged on the left side of the refracting member 22, and is connected to a control device 27 via the cable 26. As shown in FIG. 1, the cable 26 is extended leftward from the left side part of the camera member 23 and connected to the left side part of the frame portion 3 of the safety glasses 2. Then, the cable 26 is connected to the control device 27 held by the wearer. The cable 26 as such enables a signal instructing the camera member 23 to perform image-capturing and enables data obtained by the camera member 23 to be transmitted and received between the camera member 23 and the control device 27. Also, via the cable 26, power is supplied from the control device 27 to the camera member 23. The control device 27 includes a switch for causing the camera member 23 to perform image-capturing, a power source, a wireless communication function, and the like, and the wireless communication function allows the data input from the camera member 23 to be communicated via a network. As a result, still images and moving images captured by the camera member 23 can be transmitted through the wireless communication and displayed on the monitor. Note that the left side part of the camera member 23 corresponds to the laterally outer part according to the present invention, and the left side corresponds to the lateral outside according to the present invention.

The camera member 23 includes a function for adjusting a focal length and an F-number (aperture) within a predetermined range, and includes an adjustment means for adjusting the focal length and the F-number. By adjusting the focal length and the F-number with this adjustment means, the angle of view can be changed, and the image-capturing range to be image-captured by the camera member 23 can be determined. Since conventionally known means can be applied to such adjustment means, details thereof are omitted.

Furthermore, the visible object image-capturing device 21 includes a housing 25 in which the refracting member 22 and the camera member 23 are supported and fixed, and the housing 25 is fixedly set to the magnifying glass 11 on the left side of the loupe portion 6. The housing 25 has an opening (not shown) formed in the front surface portion facing the rear surface portion of the left magnifying glass 11, via which the front surface 22*a* of the refracting member 22 faces the rear surface portion of the magnifying glass 11. Furthermore, the housing 25 has an opening (not shown) formed in the rear surface portion thereof, via which the rear surface 22*b* of the refracting member 22 faces the shield portion 4 of the safety glasses 2 in the use position. Also in the right side surface of the housing 25, an insertion hole (not shown) via which the cable 26 is inserted is formed.

Figure 6:
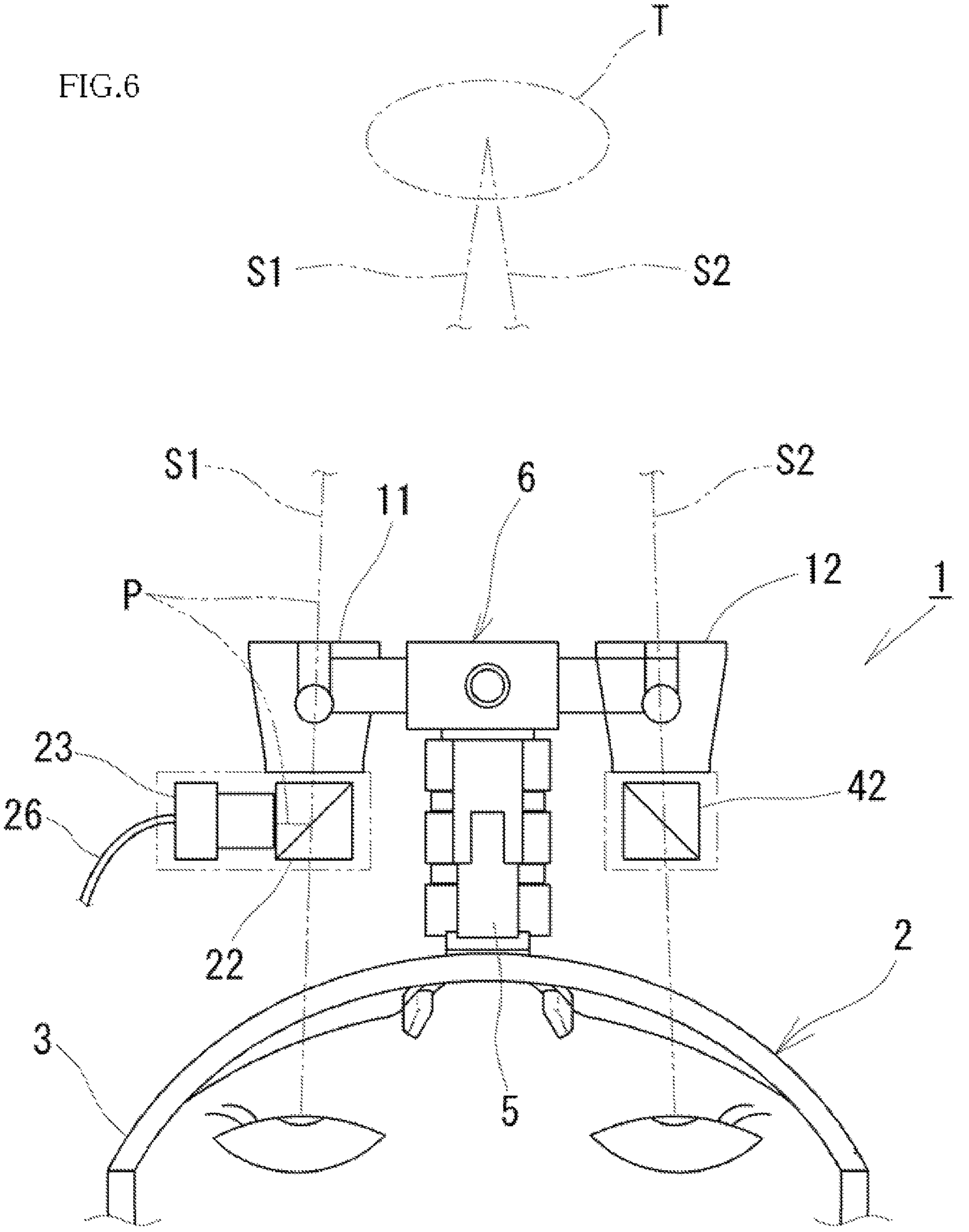
FIG. 6 is an explanatory diagram showing a line-of-sight S1 of a wearer and a gaze axis P of a camera member in the head-mounted loupe 1.

In such a visible object image-capturing device 21, an incident light entering from the front of the magnifying glass 11 via the magnifying glass 11 on the left side of the loupe portion 6 is split into the transmitted light transmitting from the rear surface 22*b* through the slope 24*a* of the refracting member 22 and the reflected light transmitting from the left side surface 22*c* by being reflected by the slope 24*a*. As a result, as shown in FIG. 6, the gaze axis P of the camera member 23 is refracted by the slope 24*a* of the refracting member 22 and coincides with the line-of-sight S1 of the wearer's left eye passing through the refracting member 22 of the visible object image-capturing device 21 and the magnifying glass 11. Here, the line-of-sight S1 indicates a line-of-sight passing through the center or the vicinity of the center of the magnifying glass 11. Similarly, a line-of-sight S2 of the right eye, which will be described later, indicates a line-of-sight passing through the center of the magnifying glass 12 or its vicinity.

On the other hand, the visual aid 41 includes a refracting member 42 and a housing 45 in which the refracting member 42 is supported and fixed. This refracting member 42 is the same as the refracting member 22 of the visible object image-capturing device 21, and is arranged symmetrically with the refracting member 22 immediately behind the right magnifying glass 12. That is, the refracting member 42 is arranged immediately behind the right magnifying glass 12 so that the slopes 24*a*, 24*a* of the right-angle prisms 24, 24 are along the oblique direction from the right rear end to the left front end in the use position, and the front surface of the refracting member 42 faces the rear surface portion of the magnifying glass 12 (the lens surface fitted in the rear end part of the lens barrel). Then, anti-reflective coatings are applied to the front surface, the rear surface (the surface facing the shield portion 4 in the use state), and the right side surface of the refracting member 42, and to other three surfaces, black coatings are applied to suppress the input and output of light. Furthermore, a mirror coating (metal coating) is applied to the slope 24*a*.

Since the refracting member 42 is the same beam splitter as the refracting member 22 of the visible object image-capturing device 21 described above, the incident light entering from the front of the magnifying glass 12 via the magnifying glass 12 on the right side of the loupe portion 6 is split into the transmitted light transmitting from the rear surface through the slope 24*a* and the reflected light transmitting from the right side surface by being reflected by the slope 24*a*. As a result, the incident light is split in the same manner as the refracting member 22 of the visible object image-capturing device 21 described above. Thus, since the left and right magnifying glasses 11, 12 are provided with the refracting members 22, 42 respectively, it is possible to suppress the sense of incongruity with respect to the images reflected on the left and right eyes of the wearer.

In the head-mounted loupe 1 of the Example 1, as shown in FIG. 10A, the magnifying glasses 11, 12 of the loupe portion 6 have a magnification of 2.5×, a working distance of 320 to 420 mm, and a field of view of ϕ100 mm. On the other hand, the camera member 23 is configured with a CCD camera and a lens, and the lens has a focal length of 3.6 to 4 mm and is adjusted to have an image-capturing range substantially the same as the field of view T (ϕ100 mm) in the working distance (420 mm) in the Example 1. As a result, it is possible to image-capture a range substantially the same as the field of view T (corresponding to the visible range of the present invention) of the wearer via the magnifying glasses 11, 12 of the loupe portion 6 as a gaze point.

The head-mounted loupe 1 of the Example 1 is worn on the wearer's head and the loupe portion 6 is arranged at the use position so that the wearer can view a magnified object in the working distance via the magnifying glasses 11, 12 of the loupe portion 6. Here, as shown in FIG. 6, the wearer's left eye sees the object via the refracting member 22 of the visible object image-capturing device 21 and the magnifying glass 11 on the left side of the loupe portion 6, while the wearer's right eye sees the object via the refracting member 42 of the visual aid 41 and the magnifying glass 12 on the right side of the loupe portion 6. That is, the line-of-sight S1 of the left eye passes through the refracting member 22 and the left magnifying glass 11 to reach the object, and the line-of-sight S2 of the right eye passes through the refracting member 42 and the right magnifying glass 12 to reach the object.

On the other hand, the gaze axis P of the camera member 23 of the visible object image-capturing device 21 is refracted by the slope 24*a* of the refracting member 22 of the visible object image-capturing device 21 and passes through the magnifying glass 11 on the left side of the loupe portion 6 to reach the object. Therefore, the gaze axis P of the camera member 23 coincides with the line-of-sight S1 of the wearer's left eye described above between the slope 24*a* of the refracting member 22 and the object. As described above, the camera member 23 has an image-capturing range that is substantially the same as the field of view (visibility range) T that the wearer can visually recognize via the loupe portion 6. For this reason, by image-capturing still images and moving images with the camera member 23 and displaying these still images and moving images on a monitor, a person viewing the monitor can view the object the wearer is viewing at the same eye level as the wearer in the same manner.

Thus, since the head-mounted loupe 1 of the Example 1 can image-capture still images and moving images at the same eye level as the wearer, for example, if it is used by the operation doctor in an operation, an assistant and observers can view the surgical situation at the same eye level as the operation doctor. Therefore, during the operation, the assistant or the observers can accurately know the surgical situation, so that it is possible to give appropriate advice or the like according to the surgical situation. It also helps to accurately disseminate knowledge about various surgical situations to students and other medical professionals by viewing recorded images after the operation.

In the configuration of the Example 1, since the position of the loupe portion 6 (as well as the visible object image-capturing device 21 and the visual aid 41) can be optionally changed by being pivotally moved in the vertical direction while being worn on the wearer's head, the use position and the standby position can be appropriately changed according to the wearer, therefore, convenience for the wearer can be further improved.

Example 2

Figure 7:
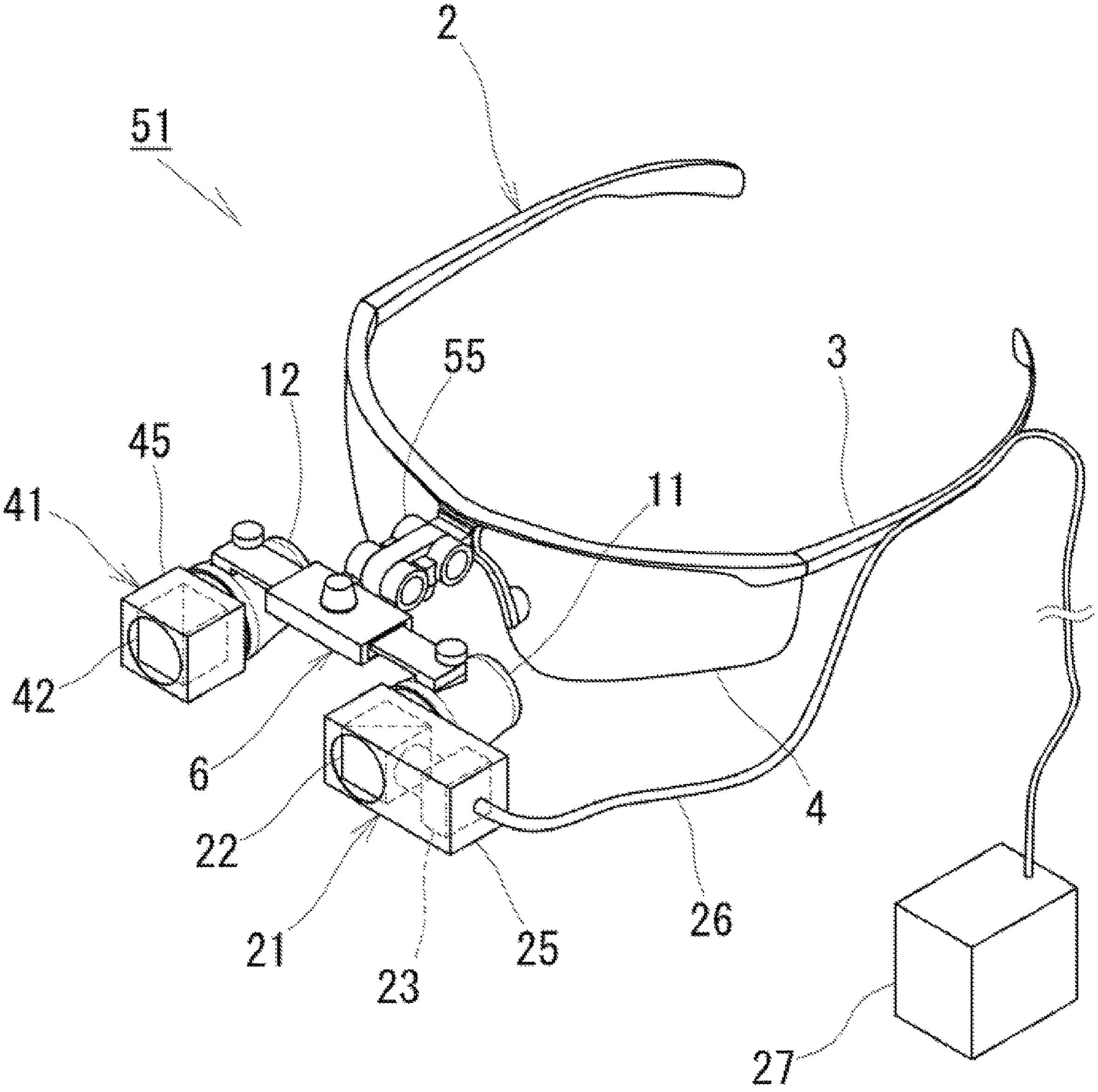
FIG. 7 is a perspective view showing a head-mounted loupe 51 of Example 2.

As shown in FIGS. 7, 8, in the head-mounted loupe 51 of the Example 2, the visible object image-capturing device 21 is attached to the front part of the left magnifying glass 11 configuring the loupe portion 6 at the use position, while the visual aid 41 is attached to the front part of the right magnifying glass 12 at the use position.

In the configuration of the Example 2, the loupe portion 6 is attached to the frame portion 3 of the safety glasses 2 via a jump-up connection portion 55, and is pivotally supported by the jump-up connection portion 55 to be pivotable in the vertical direction. As a result, the loupe portion 6 can be switched between a use position arranged in front of the shield portion 4 of the safety glasses 2 and a standby position arranged above the shield portion 4. Here, the jump-up connection portion 55 of the Example 2 is configured by including two support shafts arranged in parallel in the front and rear direction, and compared to the jump-up connection portion 5 of the Example 1 described above, the width in the front and rear direction is narrow, and also the pivot angle in the vertical direction is narrow. Specifically, the jump-up connection portion 55 includes a frame fixing portion fixedly set to the central part of the frame portion 3, a rotating portion pivotally supported by the frame fixing portion via a first support shaft, and a loupe fixing portion that is pivotally supported by the rotating portion and fixed to the loupe portion 6 via a second support shaft that is parallel to the first support shaft. With such a jump-up connection portion 55, in the configuration of the Example 2, the gap between the loupe portion 6 and the shield portion 4 is narrower than that of the Example 1 described above at the use position, and the loupe portion 6 approaches the shield portion 4, and also the loupe portion 6 can be pivotally moved within a range of 140 to 160 degrees between the use position and the standby position. Note that in the Example 2, the jump-up connection portion 55 corresponds to the jump-up means according to the present invention.

As in the Example 1, the visible object image-capturing device 21 has the refracting member 22 and the camera member 23 supported and fixed inside the housing 25, and the housing 25 is fixedly set to the magnifying glasses 11 on the left of the loupe portion 6. Here, the refracting member 22 is arranged immediately in front of the left magnifying glass 11 so that the slopes 24*a*, 24*a* of the right-angle prisms 24, 24 are along the oblique direction from the left rear end to the right front end at the use position, and the rear surface 22*b* of the refracting member 22 faces the front surface portion of the left magnifying glass 11 (the lens surface fitted in the front end of the lens barrel). The housing 25 has an opening formed at a portion facing the front surface 22*a* of the refracting member 22 and an opening formed at a portion facing the rear surface 22*b* of the refracting member 22. As a result, in the use state, the front surface 22*a* of the refracting member 22 is exposed forward, while the rear surface 22*b* faces the rear surface portion of the left magnifying glass 11. As in the Example 1, the camera member 23 is arranged on the right side of the refracting member 22 with the camera lens facing the left side surface 22*c* of the refracting member 22. In addition, the cable 26 is connected to the left side part of the camera member 23.

Furthermore, as in the Example 1, the visual aid 41 has the refracting member 42 supported and fixed inside the housing 45, and the housing 45 is fixedly set to the magnifying glass 12 on the right side of the loupe portion 6. The refracting member 42 is the same as the refracting member 22 and is arranged symmetrically with the refracting member 22. Here, the refracting member 42 is arranged immediately in front of the right magnifying glass 12 so that the slopes 24*a*, 24*a* of the right-angle prisms 24, 24 are along the oblique direction from the right rear end to the left front end at the use position, and the rear surface of the refracting member 42 faces the front surface portion of the right magnifying glass 12 (the lens surface fitted in the front end of the lens barrel). Note that the housing 45 has an opening formed at a portion facing the front surface of the refracting member 42 and an opening formed at a portion facing the rear surface of the refracting member 42. As a result, the front surface of the refracting member 42 is exposed forward, while the rear surface faces the front surface portion of the right magnifying glass 12.

Thus, in the Example 2, the visible object image-capturing device 21 arranged behind the left magnifying glass 11 in the Example 1 is arranged in front of the magnifying glass 11, and the visual aid 41 arranged behind the right magnifying glass 12 in the Example 1 is arranged in front of the magnifying glass 12, therefore, the configuration is the same as that of the Example 1 except that these arrangement positions are different. Therefore, the same components are denoted by the same reference signs, and the description thereof is omitted as appropriate.

The head-mounted loupe 51 of the Example 2 has the same magnifying glasses 11, 12 as in the Example 1 (magnification: 2.5×, working distance: 320 to 420 mm, field of view: ϕ100 mm). On the other hand, the camera member 23 has the same configuration as that of the Example 1, but since the visible object image-capturing device 21 is arranged in front of the magnifying glass 11, a lens with a focal length of 6 mm is used (see FIG. 10A) so that the image-capturing range is substantially the same as the field of view T of the loupe portion 6.

Figure 9:
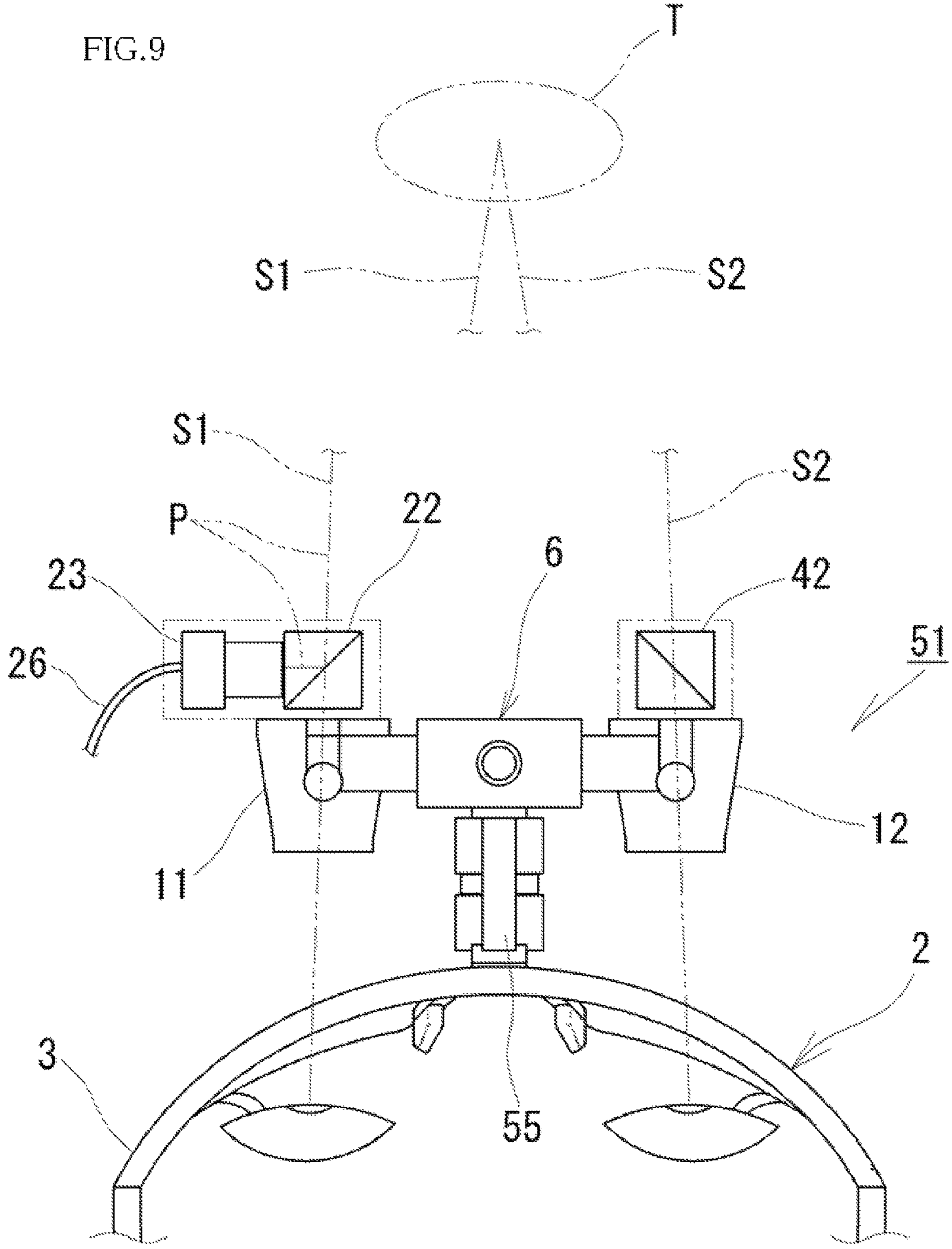
FIG. 9 is an explanatory diagram showing the line-of-sight S1 of the wearer and the gaze axis P of the camera member in the head-mounted loupe 51.

As shown in FIG. 9, the head-mounted loupe 51 of the Example 2 is worn on the wearer's head so that the loupe portion 6 is at the use position, as a result, an object magnified via the loupe portion 6 can be viewed as in the Example 1 described above. Here, the line-of-sight S1 of the left eye of the wearer passes through the magnifying glass 11 on the left side of the loupe portion 6 and the refracting member 22 of the visible object image-capturing device 21 to reach the object, and the line-of-sight S2 of the right eye passes through the right magnifying glass 12 and the refracting member 42 of the visual aid 41 to reach the object. On the other hand, the gaze axis P of the camera member 23 is refracted by the slope 24*a* of the refracting member 22 to reach the object. Therefore, the gaze axis P and the line-of-sight S1 of the left eye coincide. By adjusting the F-number as described above, the camera member 23 is set to have an image-capturing range that is substantially the same as the field of view T magnified by the loupe portion 6. For this reason, even in the Example 2, still images and moving images captured by the camera member 23 make it possible to view the object at the same eye level as the wearer. Therefore, even in the configuration of the Example 2, it is possible to obtain the same effects as those of the Example 1 described above.

The present invention is not limited to the Examples 1 and 2 described above, and may be modified as appropriate without departing from the scope of the present invention. For example, the dimensions and shapes of each part in the above-mentioned examples can be changed as appropriate.

In the Examples 1, 2, although the loupe portion 6 is directly attached to the frame portion 3 of the safety glasses 2 via the jump-up connection portions 5, 55, it is not limited thereto, but the jump-up connection portions 5, 55 may be indirectly attached to the frame portion 3 by being attached to the shield portion 4 of the safety glasses 2. For example, when the safety glasses are configured to include a pair of left and right frame portions connected to the both left and right ends of the shield portion, such a configuration is applied that the loupe portion is attached to the shield portion via the jump-up connection portion as described above. Furthermore, the jump-up connection portion may be attached to the frame portion 3 via a sliding part that allows the jump-up connection portion to slide vertically. Here, in the case of configuration in which the sliding part is provided, the cable 26 of the camera member 23 may be configured to extend upward from the upper surface of the camera member 23.

In the Examples 1, 2, different magnifications, working distances, and fields of view may be applied to the magnifying glasses 11, 12 of the loupe portion 6 as appropriate. For example, a configuration using a magnifying glass with a magnification of 3.5× (with the same working distance and field of view) can be used. When this magnifying glass is used, in the configuration in which the visible object image-capturing device 21 is arranged behind the magnifying glass as in the above-mentioned Example 1, as shown in FIG. 10B, the camera member 23 of the same lens as that of the Example 1 can be applied. On the other hand, in the configuration in which the visible object image-capturing device 21 is arranged in front of the magnifying glass as in the Example 2 described above, the camera member 23 shall use a lens with a focal length of 8 mm. As a result, regardless of whether the visible object image-capturing device 21 is arranged in front of or behind the magnifying glass, the image-capturing range of the camera member 23 can be substantially the same as the field of view T of the magnifying glass (magnification of 3.5×).

In the Examples 1, 2, it is also possible to apply different specifications to the camera members 23. For example, cameras with different CCD sizes and resolutions can be applied, and lenses are applied according to the cameras.

In the Examples 1, 2, although the visible object image-capturing device 21 is arranged in front of or behind the left magnifying glass 11 configuring the loupe portion 6, it is not limited thereto, but also can be arranged in front of or behind the right magnifying glass 12. In this case, the refracting member 22 and the camera member 23 shall be arranged so that the visible object image-capturing device 21 is symmetrical with the Example 1, 2. In this configuration, since the line-of-sight S2 of the wearer's right eye and the gaze axis P of the camera member 23 coincide, the same effects as in the Examples 1, 2 can be obtained.

Figure 11:
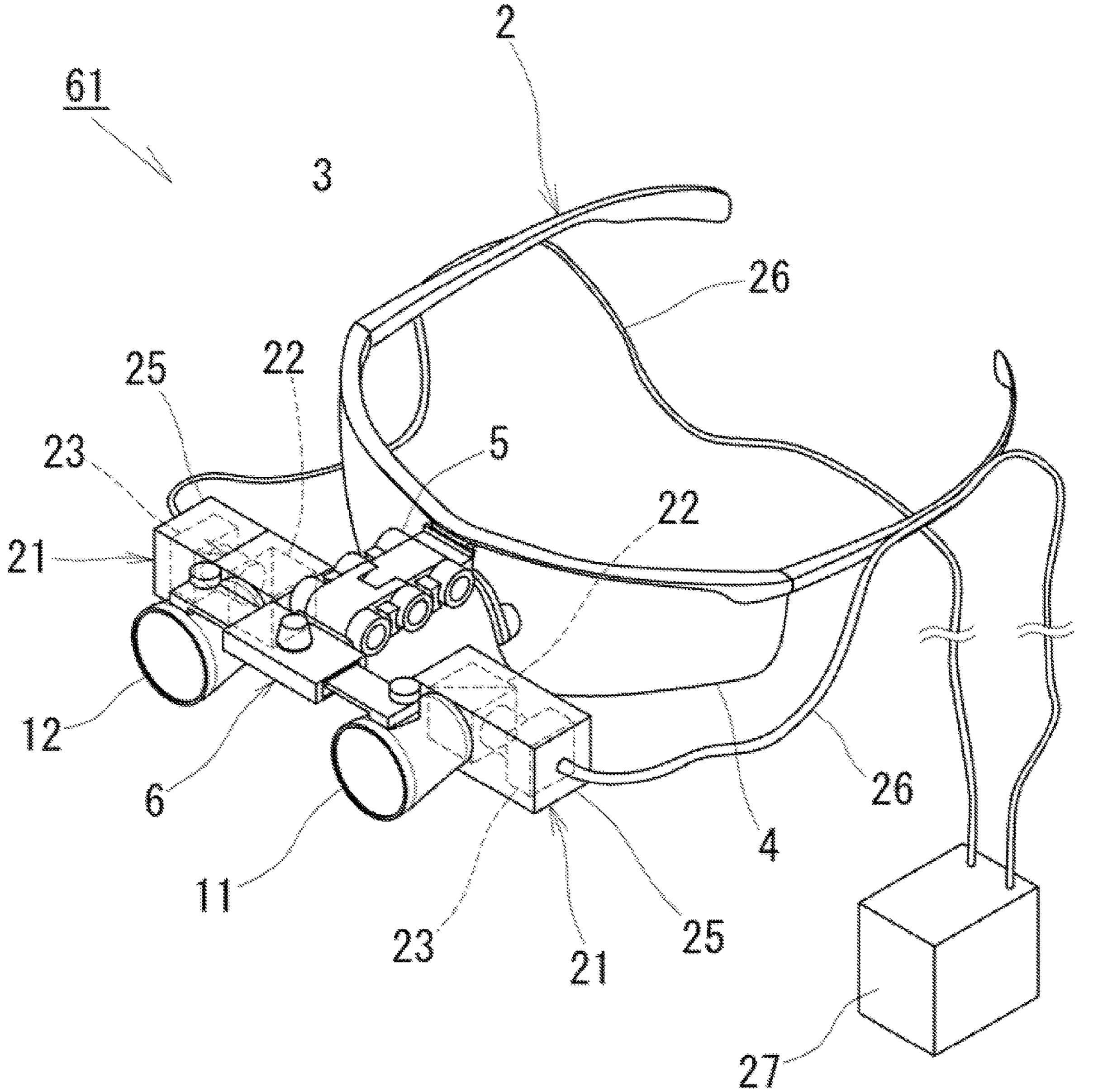
FIG. 11 is a perspective view showing a head-mounted loupe 61 of the variations.

Furthermore, it is also possible to apply a configuration (head-mounted loupe 61) in which the visible object image-capturing device 21 is arranged in each of the left and right magnifying glasses 11, 12. For example, as shown in FIG. 11, the head-mounted loupe 61 has the visible object image-capturing device 21 arranged immediately behind the left magnifying glass 11 and the visible object image-capturing device 21 arranged immediately behind the right magnifying glass 12. Here, the visible object image-capturing device 21 arranged in the left magnifying glass 11 is arranged as in the Example 1 described above, while the visible object image-capturing device 21 arranged in the right magnifying glass 12 is provided symmetrically with the left visible object image-capturing device 21. That is, the right refracting member 22 is arranged symmetrically with the left refracting member 22, and the right camera member 23 is arranged symmetrically with the left camera member 23. In such a configuration, the line-of-sight S1 of the left eye and the gaze axis P of the left camera member 23 coincide, while the line-of-sight S2 of the right eye and the gaze axis P of the right camera member 23 coincide. With such a configuration, the left and right camera members 23, 23 can image-capture 3D moving images. Similarly, the visible object image-capturing device 21 may be configured to be arranged immediately in front of each of the left and right magnifying glasses 11, 12.

In the Examples 1, 2, it is also possible to apply different specifications to the refracting member 22. For example, in the Examples 1, 2, the mirror coating is applied to the slope 24*a* of the right-angle prism 24, but the refracting member 22 may also be configured such that the mirror coating is not applied to the slope 24*a*.

In the Examples 1, 2, the loupe portion 6 is attached to the frame portion 3 via the jump-up connection portions 5, 55, but is not limited thereto, and may be directly fixed to the frame portion 3 or the shield portion 4.

In the configuration of the Examples 1, 2, the control device 27 is provided to communicate data image-captured by the camera member 23 via the network. However, it is not limited to thereto, and the control device 27 may be configured to include a storage means for storing the data, for example.

REFERENCE SIGNS LIST

1, 51 head-mounted loupe
2 safety glasses
3 frame portion
4 shield portion
5, 55 jump-up connection portion
6 loupe portion
11, 12 magnifying glass
21 visible object image-capturing device
22 refracting member
22*a* front surface
22*b* rear surface
22*c* left side surface
23 camera member
24 right-angle prism
24*a* slope
25 housing
26 cable
27 control device
41 visual aid
42 refracting member
S1, S2 line-of-sight
P gaze axis

The invention claimed is:

1. A head-mounted loupe, comprising:

a frame portion worn on a wearer's head;

a pair of left and right magnifying glasses attached to the frame portion and arranged in front of the wearer's left and right eyes, respectively, in a use state where the frame portion is worn on the head of the wearer;

a visible object image-capturing means is arranged in front of one of the wearer's left and right eyes in the use state, wherein the visible object image-capturing means includes:

a refracting member arranged on a front or rear side of at least one of the left and right magnifying glasses, the refracting member being positioned on a line-of-sight of the wearer passing through the at least one of the left and right magnifying glasses in the use state, the refracting member including a front surface, a rear surface, and a side surface;

a camera member configured to capture a still image or moving image of an object via the refracting member; and a housing that is fixed to at least one of the left and right magnifying glasses corresponding to the one of the wearer's left and right eyes in front of which the visible object image-capturing means is arranged, the housing being configured to house the refracting member and the camera member, the housing including an insertion hole through which a cable for inputting and outputting signals and information relating to image-capturing is inserted, wherein the refracting member includes a prism and is configured to allow the wearer to visually recognize an object via the at least one of the left and right magnifying glasses positioned in front or behind the refracting member, wherein the prism includes two right-angle prisms joined together such that respective slopes of the two right-angle prisms are arranged next to each other, wherein a camera lens of the camera member faces the side surface of the refracting member, wherein the refracting member is configured to split incident light from the object into transmitted light passing through the refracting member and reflected light reflected by at least one of the slopes and transmitted from the side surface toward the camera lens, wherein the camera member receives the reflected light transmitted from the side surface through the camera lens, and wherein the refracting member also refracts a gaze axis of the camera member, the gaze axis being an optical axis of the camera member, such that a refracted gaze axis coincides with a line-of-sight of the wearer via the at least one of the left and right magnifying glasses.

2. The head-mounted loupe according to claim 1, wherein the pair of left and right magnifying glasses is attached to the frame portion so as to be arranged in front of the wearer's left and right eyes, respectively, with a predetermined gap between the left and right magnifying glasses in the use state, and the refracting member of the visible object image-capturing means is arranged behind the at least one of the left and right magnifying glasses so as to be arranged in the gap, in the use state.

3. The head-mounted loupe according to claim 1, wherein the refracting member of the visible object image-capturing means is arranged in front of the at least one of the left and right magnifying glasses, and the camera member of the visible object image-capturing means is configured to have, without using the at least one of the left and right magnifying glasses, an image-capturing range that is substantially the same as a visible range visually recognized by the wearer via the at least one of the left and right magnifying glasses.

4. The head-mounted loupe according to claim 1, comprising:

a jump-up means that is pivotable between the use state where the pair of left and right magnifying glasses are positioned in front of the wearer's left and right eyes, respectively, to allow the wearer to visually recognize an object via the left and right magnifying glasses; and a standby state where the pair of left and right magnifying glasses are positioned above a position of the left and right magnifying glasses in the use state to prevent the wearer from visually recognizing the object via the left and right magnifying glasses, wherein the left and right magnifying glasses are attached to the frame portion via the jump-up means, the visible object image-capturing means is provided to be pivotable integrally with the magnifying glasses, and the cable for inputting and outputting the signals and the information relating to image-capturing is extended laterally outward from a laterally outer part of the camera member.

* * * * *